United States Patent [19]  
Franz et al.

[11] 4,397,882  
[45] Aug. 9, 1983

[54] PROCESS FOR THE PRODUCTION OF HARD PAPER

[75] Inventors: Arnold Franz; Ernst Schneider, both of Troisdorf-Spich; Gregor Jakobshagen, Troisdorf, all of Fed. Rep. of Germany

[73] Assignee: Dynamit Nobel Aktiengesellschaft, Troisdorf, Fed. Rep. of Germany

[21] Appl. No.: 273,503

[22] Filed: Jun. 15, 1981

[30] Foreign Application Priority Data

Jun. 14, 1980 [DE] Fed. Rep. of Germany ....... 3022431

[51] Int. Cl.$^3$ ............................................. B05D 3/02
[52] U.S. Cl. .................................. 427/391; 156/335; 162/138; 427/361; 427/365; 427/369; 427/392; 427/393
[58] Field of Search ...................... 162/135, 138, 165; 427/121, 352, 361, 365, 366, 370, 393.4, 392, 391, 393, 389.9, 393.1, 369; 260/29.3, 30.6 R; 156/335

[56] References Cited

U.S. PATENT DOCUMENTS

| | | | |
|---|---|---|---|
| 2,702,758 | 2/1955 | Uhlig et al. | 427/121 |
| 2,877,136 | 3/1959 | Booth | 427/121 |
| 4,074,015 | 2/1978 | Franz et al. | 427/391 X |
| 4,150,188 | 4/1979 | Brulet | 427/391 X |

Primary Examiner—Michael R. Lusignan  
Assistant Examiner—Thurman K. Page  
Attorney, Agent, or Firm—Antonelli, Terry & Wands

[57] ABSTRACT

A process for the preparation of hard paper involves impregnating lengths of cellulose-containing material with plasticizer-containing mixture of a phenol-resol resin solution and cresol-resol resin solution according to a one-step method, subsequent drying, and then hardening of the resin-impregnated paper. The impregnating solution employed is a mixture of a 50–80% by weight phenol-resol resin solution with a 40–70% by weight cresol-resol resin solution, to which has been admixed, before impregnation, a plasticizer and additional water. The water is added in amounts of 4–12% by weight, based on the sum total weight of solid resins and plasticizer in the total solution mixture.

9 Claims, No Drawings

PROCESS FOR THE PRODUCTION OF HARD PAPER

The present invention relates to a process for the production of hard (laminated) paper wherein a cellulose-containing material is impregnated with a phenol-resol or cresol-resol resin solution, then dried, and hardened. The hard paper obtained according to the present process is distinguished by especially good electrical and mechanical properties.

It is known how to manufacture hard paper having good electrical and mechanical characteristics; for example, according to the process of DOS (German Unexamined Laid-Open Application) No. 2,637,494 the cellulose-containing material is first impregnated with 4-20 parts by weight of resin per 100 parts by weight of paper, using a resin solution which contains between 2 and 25% by weight of solid resin, 20-25% by weight of water, and the remainder being organic solvents. Optionally, this solution can contain up to 10% by weight of plasticizers and flame retardants. After applying this solution to the paper, an impregnation with a second resin solution is immediately performed, without an interposed drying step, this second resin solution can have a solid resin content of between 40 and 80% by weight.

Hard papers having similar electrical and mechanical properties so those obtained according to the process of DOS No. 2,637,494 can also be manufactured by first preimpregnating the starting paper product in a first stage with a low-molecular phenol- or cresol-resol resin from an aqueous or aqueous-alcoholic solution, wherein customarily a resin application is utilized of 15-20% by weight, based on the weight of the starting paper. This resin application is dried and thereupon the thus-resin-impregnated paper is further impregnated in another working step with an alcoholic or aqueous-alcoholic resin solution and thereafter dried once again.

These two processes, which are also called "double impregnating" processes, exhibit the following disadvantages: The first or impregnation step always takes place with a very dilute resin solution; as a consequence, a relatively high energy consumption occurs during drying of the impregnated paper. Additionally, in the last-mentioned process, a dual drying step is performed with a correspondingly high energy requirement; although the preimpregnating process according to DOS No. 2,637,494 does avoid the disadvantage of dual drying, it utilizes an amount of solvent for the preimpregnating solution which is even grater than in the two-step mode of operation.

Therefore, the problem existed of finding a process for the manufacture of hard paper wherein less solvents need to be removed and which yields a hard paper exhibiting values which correspond, with respect to water absorption, punchability, and electrical properties such as, for example, internal resistance and electrolytic corrosion, at least to the values shown by hard papers produced according to the process of DOS No. 2,637,494.

In attainment of this objective, a process has now been found for the manufacture of hard papers according to a one-step impregnation method wherein an admixture of resin solutions containing plasticizer for the resins and additional water is utilized to impregnate the cellulose-containing material.

It has been known to impregnate, in a one-step method, cellulose-containing material with an alcoholic, preferably methanolic synthetic resin solution. This solution can also contain plasticizers. In this connection, a "one-step method" is understood to mean a process wherein the cellulose-containing material is impregnated, in one step, with a single resin solution and is subsequently dried. After drying, the resin-impregnated cellulose-containing material is first precondensed at temperatures of between 130° C. and 180° C. and thereafter several superimposed layers of this paper (prepregs) are compressed to form the hard paper product at temperatures of between 150° C. and 180° C. and under a pressure of between 70 and 180 kp/cm$^2$ within 30-90 minutes.

Hard papers produced with the use of these conventional solutions in a one-step method exhibit, however, a disadvantageously high water absorption. Thus, for example, in case of a hard paper plate impregnated by a one-step method and having a thickness of 1.5 mm, the water absorption according to DIN (German Industrial Standard) 77 35, Sheet 1, is more than 0.8% by weight, based on the total hard paper weight. These values are so high that the resultant hard papers are unsuitable for some fields of usage.

Although water resistance can be improved in this one-step method by reducing the plasticizer proportion, this measure results in increase of brittleness of the hard papers, so that they are difficult to punch out.

The process of this invention is based on the fact, heretofore unknown, that mixtures of phenol- and cresol-resol resins exhibit, in part, properties different from those exhibited by the resins contained therein individually. Thus, such mixtures are compatible with water in amounts of up to 12% by weight, based on the weight of the total resol solution, even if the plasticizer proportion in the solution is up to 35% by sum total of the weight of resin solids and plasticizer in the weight, based on the resultant admixture.

Furthermore, it has been realized that the addition of water to the plasticizer-containing phenol-/cresol-resol resin mixture affects the physical properties of a hard paper manufactured with the use of a corresponding impregnating solution. Surprisingly, if a certain, selected amount of water is added subsequently to the resol resin solution, better physical properties of the thus-produced hard papers evolve than with the use of a resol resin impregnating solution which contains bound therein a water content stemming from its preparation.

The phenol- and cresol-resols contained in the resol resin solution are conventional resols (A-stage resins). These resols are prepared by alkaline condensation of phenol and/or cresols with formaldehyde in a molar ratio of 1:>1. The molar ratio of phenols:formaldehyde is chosen so that, after the condensation reaction and removal of the water by distillation, a resol is obtained, the B-period of which is 7-9 minutes, and the solid resin content of which, in case of cresol-resol, ranges between 95 and 99% by weight and, in case of phenol-resol, between 50 and 80% by weight. These resols contain, due to their manufacture, minor amounts of water ranging in the phenol-resols between 25 and 35% by weight and in the cresol-resols below 3%.

This water content is not taken into account in the intermixing of the additional water according to this invention. The water content was determined according to the method by K. Fischer, which was described in Angew. Chemie 47 (1935) 394.

The preparation of such resol resins with the indicated physical values is known per se to persons skilled in the art. In the preparation of the phenol-resol resin, sodium hydroxide solution is preferably chosen as the alkali, and the molar ratio of phenol (100% strength)-:formaldehyde is preferably between 1:1.3 and 1:1.5. The cresol-resol resins are preferably produced in an ammoniacal medium with a molar ratio of cresols:formaldehyde of between 1:1.0 and 1:1.1. The cresol-resol resin obtained after condensation and removal of the water by distillation cannot be diluted with water. It is brought to a solid resin content of between 40 and 70% by weight by adding aliphatic alcohols of 1–3 carbon atoms, preferably methanol.

The mixture of phenol-resol resin and cresol-resol resin usable according to this invention as an impregnating solution can contain these two resin components in a weight ratio of 1:5 to 5:1. Preferably, the weight ratio of cresol-resol:phenol-resol resin is in the range from 2:1 to 3:1. This mixture contains, due to its preparation, between 4 and 12% by weight of water, preferably between 5 and 9% by weight.

According to the invention, this phenol-/cresol-resol mixture is furthermore intermixed with plasticizer in amounts of between 20 and 35% by weight and additional water in amounts of between 4 and 12% by weight, preferably between 6 and 10% by weight, respectively based on the sum total of the weight of resin solids and plasticizer in the resultant admixture. In general, the plasticizer is dissolved in the resols first of all, and then the water is admixed. In principle, however, it is also possible to admix the plasticizer and water, optionally in a mixture with an organic, water-miscible solvent, together to the resols.

The admixing of the water is suitably carried out with the concomitant use of a water-soluble, organic solvent as a solubilizer. This solubilizer is preferably used in such amounts that the weight ratio of water:solvent ranges about between 1:1 and 1:2. The use of considerably lower quantities of solvents is likewise feasible, if this makes it possible to intermix the water with the resol resin solution. Especially advantageous solvents are acetone and methanol due to their low boiling points. Basically, however, it is also possible to employ as solubilizers other solvents which can be mixed with water, for example ethanol, isopropanol, tetrahydrofuran, or dioxane.

Suitable plasticizers for the process of this invention are all those monomeric plasticizers which can be employed for eliminating hardness and brittleness of high-polymeric compounds. Among these are especially phosphoric acid esters, e.g., diphenyl cresyl phosphate, and phenoxyacetals, such as, for example, diphenoxyethyl formal. Other compounds likewise known for use as plasticizers in impregnating solutions for hard papers can also be employed.

As in the conventional processes, the cellulose-containing material to be impregnated for the hard paper production can be cellulose, papers, such as, for example, cotton papers, preferably cotton linters paper, or also sulfite cellulose as obtained from fir and pine wood, etc.

According to the invention, the dry paper is first saturated with the impregnating solution. This can basically be accomplished by spreading thereof, for example with a roll, by spraying, or by dipping. In continuous processes, the operation is preferably conducted so that a paper web is conducted through an impregnating bath with the impregnating solution according to the present invention.

After wetting with the impregnating solution, the paper, loaded with the synthetic resins, is conventionally dried and the synthetic resin is precondensed, using advantageously a drying duct for this purpose. The final hardening of the thermosets takes place conventionally under a hot press with the use of a pressure of 70–180 kp/cm$^2$ and temperatures in the range from 130° to 180° C., preferably about 170° C. In this process, several superimposed layers of the impregnated and preliminarily dried paper must usually be compressed together whereby correspondingly stronger hard (laminated) papers are obtained. The pressing periods are 30–90 minutes.

The hard paper manufactured with the impregnating solution according to the present invention is to possess, after hardening, i.e. curing, a content of synthetic resin and plasticizers which amounts to between 70 and 150% by weight, preferably about 100–130% by weight, based on the weight of the unloaded paper.

The process of this invention exhibits a considerable advance in the art as compared with the state of the art. As contrasted to the two-stage process and the preimpregnating process of DOS No. 2,637,494, substantially smaller amounts of organic solvents are required, thus obtaining, besides a lowering of costs, also a lower pollution rate for the waste air purification unit. The products are hard papers of high quality with respect to their electrical properties, which furthermore are distinguished by a low water absorption and furthermore can be readily punched out.

It was additionally surprising that such a one-step method of impregnation can be realized at all, inasmuch as the prevalent opinion was that plasticizer-containing, alcoholic cresol and phenolic resin solutions could absorb very little water. On the other hand, it could not be expected that the relatively small quantities of water would exert such a great influence on the impregnating effect.

For the following examples, the same cresol-resol and phanol-resol resin solutions were employed in each particular case, and these solutions were prepared as follows:

PREPARATION OF CRESOL RESIN SOLUTION A 100 parts of weight of a cresol mixture, 80 parts by weight of a 36% strength aqueous formaldehyde solution, and 0.5 part by weight of ammonia (concentrated) were made to enter a condensation reaction at the boiling temperature of this mixture. Thereafter, water was distilled off until an approximately 98.5% synthetic resin solution was obtained. The percentage indication refers to the solution. This solution was diluted to 50% by weight by the addition of methanol.

The thus-prepared synthetic resin solution involves a resol resin, the B-period of which is 8 minutes at 150° C. The viscosity of the solution is 55 cp at 20° C.

The method for determining the B-period will be described below: A hemispherical indentation ($r = 1$ cm) is worked into the surface of a cubic or cylindrical iron block heated to 130°–150° C. The indentation is filled with 0.15 g of the liquid or pulverulent resin to be tested, and the resin is constantly stirred with a glass rod drawn out to a tip. The B-stage or the B-period is reached when the filaments which can be drawn out of the specimen with the glass rod rupture and recoil rubber-elastically.

PREPARATION OF PHENOLIC RESIN SOLUTION B 100 parts by weight of phenol, 120 parts by weight of a 36% aqueous formaldehyde solution, and 1 part by weight of sodium hydroxide were made to enter a condensation reaction at boiling temperature, e.g. 100° C. Thereafter, water was distilled off until the solids content of the thus-produced phenol-resol solution was 70% by weight. The B-period was 7 minutes at 150° C., the viscosity of the solution was 250 cp at 20° C.

EXAMPLE 1

9.2 kg of cresol-resol resin solution A and 3.4 kg of phenol-resol resin solution B were mixed, and the thus-obtained mixture was then intermixed with 3.0 kg of diphenyl cresyl phosphate. The resultant, plasticizer-containing resol resin solution was blended with 0.9 kg of water together with 0.45 kg of acetone, under agitation.

A cotton paper having a width of 2700 mm and a weight per unit area of 120 g/m$^2$ was continuously passed through the impregnating bath produced in this way. The immersion period was 30 seconds.

The paper web, moistened with the impregnating solution, was thereupon conducted over two rollers and then between two steel cylinders where the excess resin solution was removed by squeezing. From the cylinders, the length of paper was further conducted through a drying duct wherein it was heated within 4 minutes at an ascending temperature from 140° C. to 170° C. During this step, the synthetic resol resins were precondensed.

The length of paper exiting from the drying duct was cut in a subsequent cutter into rectangular pieces having a length of 2800 mm and a width of 1300 mm. Seven of these paper sheets were combined and heated, under a hot press, for 60 minutes under a pressure of 100 kp/cm$^2$ to 170° C. In this way, a hard paper panel having a thickness of about 1.5 mm was produced.

Another impregnating test was conducted, which differed from the first-mentioned one only in that the impregnating solution contained neither water nor acetone. The hard paper panel resulting from this second test practically was no different in appearance from the panel produced in the first test. The two hard papers, however, exhibited greatly different physical values. These are compiled in Tables 2 through 4.

TABLE 1

| | | | Characteristic Value | |
|---|---|---|---|---|
| Type of Test | Standard | Pretreatment | Impreg. w. Solution Contain. H$_2$O and Acetone | Impreg. w. Solution Not Containing H$_2$O and Acetone |
| Hole Test, longit. | DIN 53488 | 23° C. | 2.5–3.3 | 2.3–3.2 |
| Hole Test, longit. | DIN 53488 | 45° C. | 2.0–2.2 | 1.9–2.2 |
| Hole Test, longit. | DIN 53488 | 60° C. | 1.6 | 1.6 |

TABLE 2

| | | Immersion Conditions | | Amount of H$_2$O Absorbed in mg | |
|---|---|---|---|---|---|
| Type of Test | Standard | Temp °C. | Time hours | Impregnated with solution containing H$_2$O and Acetone | Impregnated without H$_2$O and Acetone solution |
| Water absorption | DIN 7735 | 23 | 24 | 16–22 | 28–40 |

TABLE 3

| | | Testing Conditions | | | Characteristic Value | |
|---|---|---|---|---|---|---|
| Type of Test | Standard | Temp °C. | Rel. Atmosphere Humidity | Time hours | Impregnated With Solution Containing H$_2$O and Acetone | Impregnated Without H$_2$O and Acetone Solution |
| Electrolytic Corrosion (positive pole) | DIN 53489 | 40 | 92 | 96 | AN-AB | AB-B |
| Electrolytic Corrosion (negative pole) | DIN 53489 | 40 | 92 | 96 | 1.4–1.6 | 1.6–1.8 |
| Internal Resistance | DIN 7735 | 40 | 92 | 96 | 1.0–10 | 0.05–5.5 |

EXAMPLE 2

A cotton paper as used according to Example 1 was impregnated in the same manner with the same synthetic resol resins as in Example 1, except that the impregnating solution contained, instead of 9.2 kg of the 50% cresol resin solution A, 10.5 kg and, instead of 3.4 kg of the 70% phenolic resin solution B, 2.5 kg. The amount of plasticizer remained the same as in Example 1. Here again, impregnation was carried out on the one hand with the addition of 0.9 kg of water and 0.45 kg of acetone and on the other hand without these additives. After precondensation and subsequent hardening under a hot press, analogous differences could be demonstrated as regards the physical properties, as done in Example 1.

What is claimed is:

1. A process for the preparation of hard paper by impregnating lengths of cellulose-containing material with a plasticizer-containing phenol- and cresol-resol resin impregnating solution according to a one-step method, subsequent drying, and then hardening of the resin-impregnated paper, characterized in that the mixed resin impregnating solution consists of a mixture of a 50–80% by weight phenol-resol resin solution with a 40–70% by weight cresol-resol resin solution, to which has been admixed, before impregnation, between 20 and 35% by weight of plasticizer based on the sum total weight of solid resins and plasticizer, additionally 4–12% by weight of water, based on the sum total weight of solid resins and plasticizer in the impregnating solution and an organic water-miscible solvent in an amount up to a weight ratio of water:solvent ranging from 1:1 to 1:2.

2. A process according to claim 1, characterized in that the ratio of phenol-resol resin solution to the cresol-resol resin solution is between 1:2 and 1:3.

3. A process according to claim 1 or claim 2, characterized in that the water to be additionally admixed is utilized together with acetone or methanol in a weight ratio of water to acetone or methanol of 1:1 to 1:2.

4. A process according to claim 1 or claim 2, characterized in that the mixture of the cresol-/phenol-resol resin solution prior to the admixing of the additional water and of the plasticizer has a water content of 5–9% by weight.

5. A process according to claim 1, characterized in that 6–10% by weight of water is added, based on the sum total of solid resins and plasticizer.

6. A process according to claim 1, characterized in that the mixture of the phenol- and cresol-resol resin solution exhibits, prior to adding plasticizer and water, a water content of 4–12% by weight, and the weight ratio of the phenol- to the cresol-resol resin solution in said mixture ranges between 1:5 and 5:1.

7. A process according to claim 6, characterized in that the mixture of the phenol- and cresol-resol resin solution exhibits, prior to adding plasticizer and water, a water content of 5–9% by weight, and the weight ratio of the phenol- to the cresol-resol resin solution in said mixture ranges between 1:3 and 1:2.

8. A process according to claim 1, characterized in that the admixing of the water is effected together with acetone or methanol in a weight ratio of 1:1 to 1:2.

9. A process according to claim 1, characterized in that the phenol-resol resin solution is an aqueous solution of an alkaline condensed phenol-resol resin and the cresol-resol resin solution is an aqueous-alkanoic solution of an alkaline-condensed cresol-resol resin.

* * * * *